H. K. SANDELL.
DEVICE FOR THE MODULATION OF SOUNDS.
APPLICATION FILED FEB. 17, 1719.
1,370,159.
Patented Mar. 1, 1921.
2 SHEETS—SHEET 1.
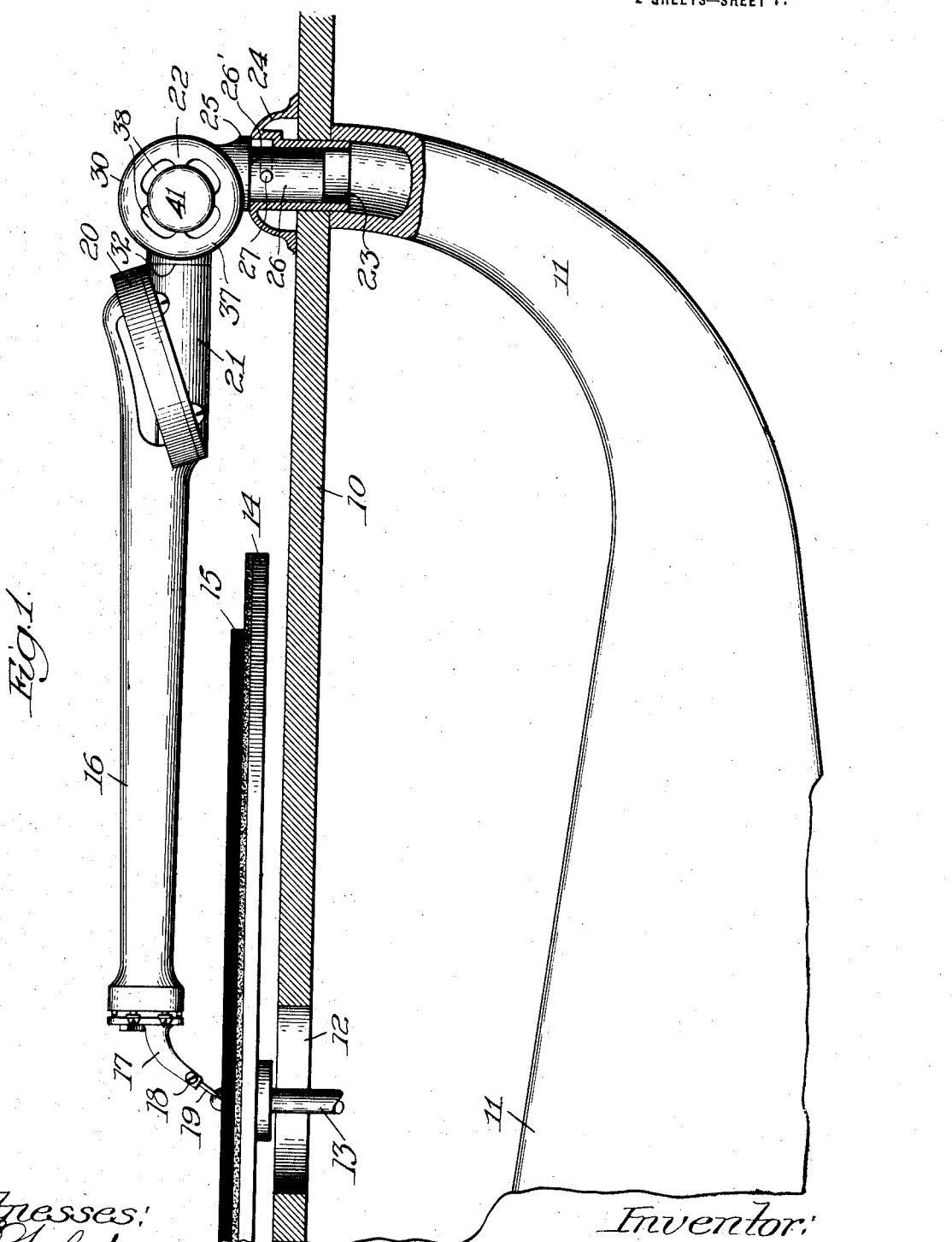

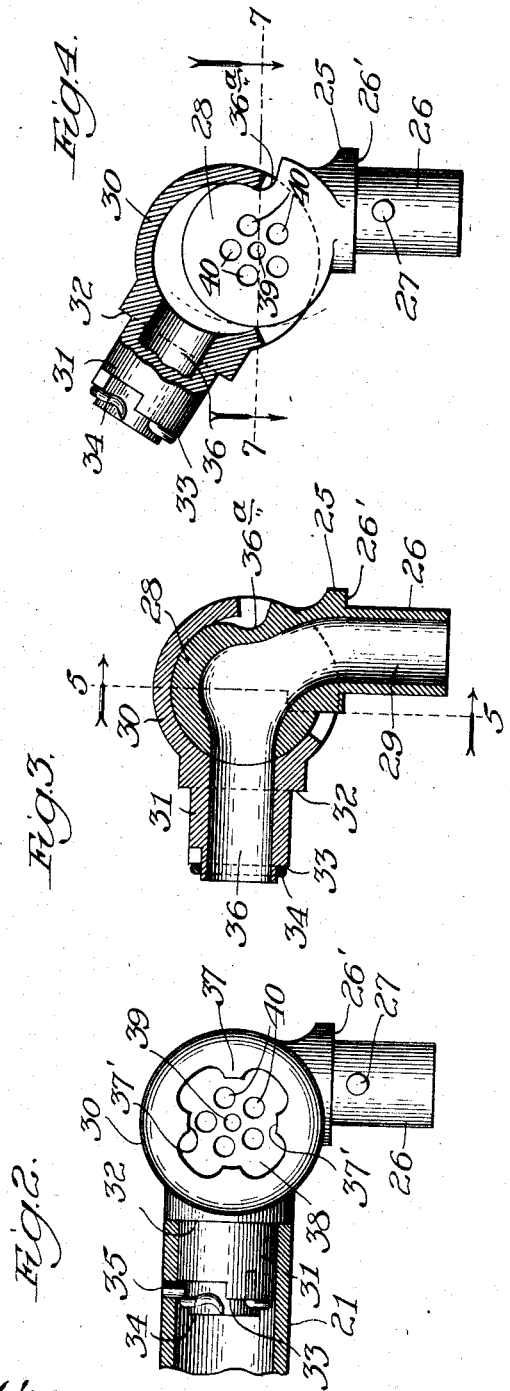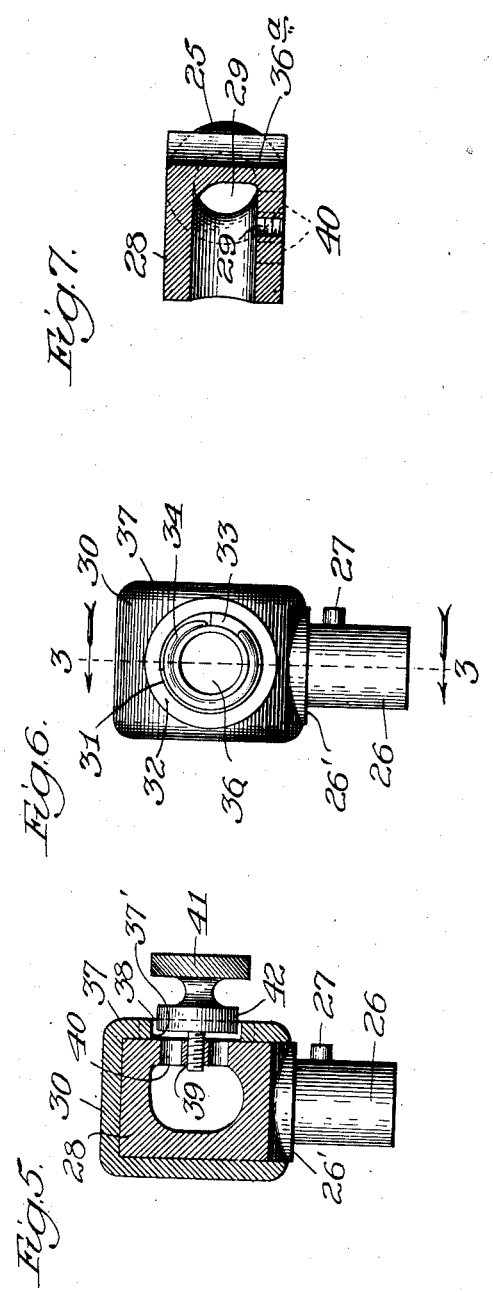

UNITED STATES PATENT OFFICE.

HENRY K. SANDELL, OF CHICAGO, ILLINOIS, ASSIGNOR TO HERBERT S. MILLS, OF CHICAGO, ILLINOIS.

DEVICE FOR THE MODULATION OF SOUNDS.

1,370,159.  Specification of Letters Patent.  Patented Mar. 1, 1921.

Application filed February 17, 1919. Serial No. 277,444.

*To all whom it may concern:*

Be it known that I, HENRY K. SANDELL, a citizen of the United States, residing at Chicago, in the county of Cook and State of Illinois, have invented a new and useful Improvement in Devices for the Modulation of Sounds, of which the following is a specification.

This invention relates to the modulation of the sounds emitted by phonographs, gramophones, or other sound-reproducing devices wherein sound waves are produced by causing the vibration of a diaphragm closing the end of a conduit or passage, in accordance with previously recorded sound waves and amplifying the sound emitted by causing the resulting waves to pass through a suitably arranged horn or like device.

In devices hitherto known for the modulation of sounds proceeding from such devices, a number of contrivances have been utilized, such as devices positively modifying the vibration of the diaphragm by the exertion of force upon it or upon the means employed for transmitting to it the recorded sound waves, and other devices varying the character of the sounds evolved by the insertion of obstructions within or in front of the horn, closing it to a greater or less extent. However, such devices are found to be disadvantageous for many reasons. Thus, where a force is exerted on the diaphragm or a member transmitting vibrations thereto there is obviously a direct resultant change in the character as well as force of the vibrations of the diaphragm, resulting not only in an undesired modification of the tone as well as a modulation of the volume of sound emitted. Furthermore, in modern devices wherein the sound vibrations are recorded in a record of plastic material and reproduced by means of a needle or stylus, the application of force to the diaphragm or to the means transmitting the movement of the stylus to the diaphragm will necessitate the use of greater force in moving the stylus and hence rapidly wear down the sound recordgrooves. Devices wherein an obstruction is placed in, or in front of the amplifying horn, result in a muffling or a throttling of the tone as well as a change in the volume of sound and are hence not satisfactory in their operation as modulators.

I have discovered that by interposing in the conduit or passage whereby the sound waves resulting from the vibrations of the diaphragm are conveyed from the rear of the diaphragm to the amplifier, controlled means permitting bleeding or leakage of air therefrom the volume and force of the sounds emitted may be readily controlled at will in accordance with the amount of leakage permitted.

In the accompanying drawings I have illustrated an embodiment of my invention wherein it is incorporated into the construction of a joint or connection in the conduit leading from the rear of the diaphragm to the amplifying horn. In the drawings—

Figure 1 is an elevation, partially in section illustrating the coöperative relation of the present embodiment of my invention with the sound box, amplifying horn and other elements of the sound reproducing device.

Fig. 2 is a side elevation of the device, showing its connection with a portion of the sound conduit, in section.

Fig. 3 is a vertical section of the device on the line 3—3 of Fig. 6.

Fig. 4 is a vertical section through the device in the process of disassembly.

Fig. 5 is a vertical section on the line 5—5 of Fig. 3.

Fig. 6 is an end elevation of the device and

Fig. 7 is a horizontal section on the line 7—7 of Fig. 4.

In the construction illustrated, 10 represents a support to the lower side of which is attached by any suitable means the amplifying horn 11. Through an opening 12 in the support 10, there extends a spindle 13, driven by any suitable motor. A record support, illustrated as a circular table 14, is attached to said spindle 13 and is rotatable therewith. Upon this table 14 the device whereupon the permanent record of the sound waves is impressed, such as the disk record 15 is placed. Over the table 14 there extends an arm 16, capable of a greater or less amount of rotary movement in a vertical plane and of a limited movement in a horizontal plane. To the end of the arm 16, extending over the table 14, is pivotally attached a needle or stylus holder 17, capable of a limited movement with respect to the arm 16. This stylus holder retains by any suitable means, such as the set screw 18, the stylus or needle 19 which follows the sound impression in the record 15 in the illustrated position of the arm 16. The arm 16 also carries the sound box 20, containing, as is customary, a diaphragm, and from the rear of said sound box there extends a conduit 21. In the device illustrated, the arm 16, the sound box 20 and the conduit 21 form a unitary construction and are attached to the member 22 in a manner hereinafter more fully described.

The member 22, which embodies the sound modulating device of my invention, is in the present construction so devised as to act as a joint and to conduct the sound waves from the conduit 21 to the conduit 23, formed as an internal sleeve depending on the boss 24 and extending into the horn 11. As will be apparent from the description hereinafter contained, the member 22 is so constructed as to permit of a vertical oscillation or swinging movement of the arm 16 and is so connected to the internal sleeve 23 of boss 24 as to permit of a horizontal swinging movement of said arm 16.

The member 22, which in the present embodiment of my invention is constructed as a two-part joint member, comprises essentially a passage or conduit together with means or mechanism so arranged as to permit the conduit to communicate directly with the outer air to an extent which will be controlled in accordance with the desires of the operator.

As shown, I may construct the member 22 of two relatively moving parts, of which one, 25, is adapted for direct attachment within the sleeve 23 of the boss 24 attached to the supporting member 10 of the phonograph or combined mechanism. The mode of attachment is such as to permit of a slight rotary movement of the element 25 relative to said sleeve 23, and this I may effect by means of a bayonet joint, the element 25 being provided with a portion 26 of reduced diameter, upon which is attached or formed a pin 27, which enters a slot 28 provided in the sleeve 23. This joint being of the well known bayonet type, it is apparent that there will be possible a limited rotary movement of the element 25 relative to the sleeve 23. Above the contracted portion 26 of less external diameter, the member 25 is enlarged to provide a head 28, of substantially circular cylindrical form. An angular bore 29 is formed within the member 25, the angle or elbow in the bore being formed within the cylindrical head 28, so that the bore emerges from the element 25 at an angle substantially 90° from that of its entry.

The head 28 of the member 25 fits in a socket 30 which forms an enlargement at the end of the tubular member 31. This socket 30 is internally of substantially cylindrical form, adapted to fit closely the head 28 of member 25, but to admit of relative rotary movement of the head within the socket.

This tubular portion 31 of the socket member has a substantially uniform bore 36, which communicates with the bore 29 within the head 28 of member 25. Externally the tubular portion 31 is provided with two shoulders, 32 and 33, formed by reducing its external diameter. The outer shoulder 32, nearest the socket member forms an abutment for the end of the conduit 21 leading from the soundbox. The shoulder 33, near the end of the tubular member 31, is recessed or cut back for an arc of approximately 90°, and a suitable resilient holding means, such as the spring steel wire 34, surrounds the element 31, lying against the shoulder 33 and substantially covering the recess in the shoulder. This resilient member terminates at approximately the end of the recess and at its end is bent somewhat away from the shoulder 33. In this way, in assembling the apparatus a pin 35 internally of the conduit 21 may be forced behind the spring or resilient member 34 into the recess in shoulder 34, and in this manner the conduit 21 will be permitted a relative movement with respect to the tubular member 31 on their common axis for the purpose of the proper positioning of the needle holder for the playing of different types of records.

To permit a convenient assembly of the device, a portion of the cylindrical surface of socket member 30 is cut away, the arc being removed being less than 180°. The side walls of the socket member 30 are left intact. The cylindrical head 28 of the member 25, is provided at its rear with an undercut 36, the relative dimensions of the various parts being such that when the undercut portion of the head 28 is brought into engagement with the end of the cut out section of the socket 30, the head and the socket may readily be separated, as shown in Fig. 4. In any other relative position of the head and socket members, their separation cannot be effected.

The means for modulating the sound emitted I prefer to embody in the joint member in the following manner:

One side wall 37 of the socket member is provided with an opening 38 which may extend over a relatively large area in the central portion of the wall. This opening may be circular or, as illustrated, provided with circular arc portions 37[1] having a common center collinear with the axis of the cylindrical interior of the socket. In the head member 28 of the member 25, on the side corresponding to that of the socket member in which the opening 38 is provided, there is bored a central screw threaded hole 39 and surrounding it a plurality of openings 40 which communicate with the internal conduit 29. When assembled, a screw 41 provided with a circular shoulder 42 is screwed into the central hole 39. This shoulder is of a diameter such as to fit in the arcuate segments 37¹ of the opening 37 in the wall 38 of socket member 30. The under face of screw 41 will, when the latter is screwed to a seat, tightly close the openings 40. In this construction the screw 41 also serves to retain the head and socket members in their assembled position.

In operation and use of the device the members of the joint are first assembled and placed in position on the boss 24, the shoulder 26¹ on member 25 serving as a seat for the joint on the boss. The conduit, to which the sound box is attached, is next assembled with the joint, being attached to the tubular portion 31 of the socket member 30 in the manner already described. By reason of the construction of the joint, a certain amount of vertical movement of the tone arm thus formed is permitted and, by reason of the mode of attachment of the joint to the supporting boss, a certain amount of horizontal movement is permitted.

When shoulder 42 of screw 41 is screwed tightly against the openings 40, the sound waves produced by the vibration of the diaphragm box pass in their full force through the entire conduit, of which the joint is a part, to the amplifying horn. If a slight turn is given the screw, a certain amount of leakage is permitted and as a result the force of the waves passing to and out of the amplifier is weakened. The amount of leakage permitted will determine in an inverse ratio, at present not definitely known, the force of the sound waves emitted from the horn. Since the character of the sound waves is in no way affected, and no obstacles giving rise to interfering waves are interposed, there is no muffling of the sound, but only a true modulation of its force or vigor.

Having thus described my invention and an embodiment thereof in detail, for the purpose of illustration, I do not limit myself to the specific details of construction, nor theories of operation set forth, except in so far as such limitations are included in the accompanying claims.

I claim—

1. A conduit joint for sound reproducing machines comprising a socket member and a head member movably fitted therein, said members being provided with communicating bores forming a conduit and with a common opening permitting communication of the interior of said conduit and its exterior, and means for closing said opening substantially as described.

2. A conduit joint for sound reproducing machines, comprising a head member, a socket member fitted thereon and movable relatively thereto, said members being provided with communicating bores forming a conduit and with coöperating openings, permitting communication of the interior of said conduit with its exterior and means for closing the openings in one of said members to close off such communication, substantially as described.

3. A conduit joint for sound reproducing machines comprising a head member, a socket member rotatably mounted thereon, said members being provided with communicating bores, the socket member being provided with an opening insufficient to permit passage of the head member in its normal position relative thereto and said head member being provided with a reduced portion permitting its removal from said socket member in one position relative thereto.

4. A conduit joint for sound reproducing machines comprising a conduit member having a substantially cylindrical head undercut at one point thereof and a conduit member having a substantially cylindrical socket fitted over said head and provided with an opening less than a diameter of said head substantially as described.

5. A conduit joint for sound reproducing machines comprising a conduit member having a substantially cylindrical head and a lateral opening in said head, a conduit member having a substantially cylindrical socket fitted over said head and a lateral opening coöperating with the opening in the head whereby leakage from the interior of said head is permitted, and means for closing said opening.

6. A conduit joint for sound reproducing machines comprising a conduit member having a substantially cylindrical head and a lateral opening in said head, a conduit member having a substantially cylindrical socket fitted over said head and a lateral opening coöperating with the opening in the head and a screw fitting within the opening in the socket member and capable of closing the opening in the head and varying the leakage therefrom.

7. A conduit member adapted to coöperate with a conduit member having an internally projecting pin having a terminal recessed shoulder and a resilient member surrounding said conduit member and being within said shoulder, said resilient member substantially closing the recessed portion of said shoulder.

8. A conduit member adapted to coöperate with a conduit member having an internally projecting pin having a terminal recessed shoulder and a resilient member surrounding said conduit member and being within said shoulder, said resilient member substantially closing the recessed portion of said shoulder and terminating near one end thereof.

HENRY K. SANDELL.